(12) United States Patent
Kim et al.

(10) Patent No.: US 7,388,035 B2
(45) Date of Patent: Jun. 17, 2008

(54) METHOD FOR PREPARING POLY(2,5-BENZIMIDAZOLE)

(75) Inventors: Hyoung-Juhn Kim, Suwon-si (KR); Yeong-Chan Eun, Suwon-si (KR); Sung-Yong Cho, Suwon-si (KR); Ho-Jin Kweon, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 576 days.

(21) Appl. No.: 10/972,421

(22) Filed: Oct. 26, 2004

(65) Prior Publication Data

US 2005/0113469 A1    May 26, 2005

(30) Foreign Application Priority Data

Oct. 30, 2003   (KR) .................. 10-2003-0076443

(51) Int. Cl.
*C08J 5/20* (2006.01)
*H01M 8/10* (2006.01)

(52) U.S. Cl. .................. 521/27; 429/33; 528/208; 528/336; 528/342

(58) Field of Classification Search ........... 528/208, 528/336, 342; 521/27; 429/33
See application file for complete search history.

(56) References Cited

U.S. PATENT DOCUMENTS

| 4,394,500 A |   | 7/1983 | Milford, Jr. |
| 4,460,763 A | * | 7/1984 | Milford, Jr. .............. 528/336 |

FOREIGN PATENT DOCUMENTS

| CN | 1264501 | 8/2000 |
| JP | 04-194022 | 7/1992 |
| JP | 06-340741 | 12/1994 |
| JP | 09-073908 | 3/1997 |
| JP | 2002-146186 | 5/2002 |
| JP | 2002-201269 | 7/2002 |
| JP | 2004-146367 | 5/2004 |
| JP | 2004-532285 | 10/2004 |
| JP | 2005-158646 | 6/2005 |
| JP | 2005-166598 | 6/2005 |
| JP | 2005-174587 | 6/2005 |
| JP | 2005-209520 | 8/2005 |
| JP | 2005-213276 | 8/2005 |
| JP | 2005-537384 | 12/2005 |
| JP | 2006-502266 | 1/2006 |
| WO | WO 02/088219 | 11/2002 |
| WO | WO 03/022412 | 3/2003 |

OTHER PUBLICATIONS

Kim et al. Synthesis of Poly(2,5-benzimidazole) for Use as a Fuel-Cell Membrane, 2004, Macromolecular Rapid Communications, 25, 894-897.*
Cho et al. Structure of a Poly(2,5-benzimidazole)/Phosphoric Acid Complex, 2004, J. of Polymer Science, vol. 42, 2676-2585.*
Eaton et al. Phosphorus Pentoxide-Methanesulfonic Acid. A Convenient Alternative to Polyphosphoric Acid, 1973, J. Org. Chem., vol. 38, No. 23, 4071-4073.*
Ueda et al. A New Synthesis of Diaryl Sulfones, 1984, Synthesis, 323-325).*
Asensio et al. Proton-Conducting Membranes Based on Poly(2,5-benzimidazole) (ABPBI) and Phosphoric Acid Prepared by direct Acid Casting, J. of Membrane Scince, 2004, vol. 241, Issue 1, 89-93.*

* cited by examiner

*Primary Examiner*—Randy Gulakowski
*Assistant Examiner*—M. Bernshteyn
(74) *Attorney, Agent, or Firm*—Robert E. Bushnell, Esq.

(57) ABSTRACT

A method for preparing poly(2,5-benzimidazole) whereby 3,4-diaminobenzoic acid is polymerized using a dehydrating reagent containing $P_2O_5$ and $CX_3SO_3H$ where X is H or F. The poly(2,5-benzimidazole) has good proton conductivity and low methanol permeability, and therefore can be used as a polymer electrolyte membrane for a fuel cell.

13 Claims, 1 Drawing Sheet

METHOD FOR PREPARING POLY(2,5-BENZIMIDAZOLE)

CLAIM OF PRIORITY

This application makes reference to, incorporates the same herein, and claims all benefits accruing under 35 U.S.C. §119 from an the Korean patent application No. 2003-76443 filed in the Korean Intellectual Property Office on Oct. 30, 2003, the disclosure of which is incorporated herein by reference.

BACKGROUND OF THE INVENTION

1. Field of the Invention

The present invention relates to a method for preparing poly(2,5-benzimidazole), and more particularly to a method for preparing poly(2,5-benzimidazole) having proton conductivity, a poly(2,5-benzimidazole) electrolyte membrane prepared according to the method, and a fuel cell comprising the poly(2,5-benzimidazole) electrolyte membrane.

2. Description of the Related Art

Fuel cells as electrochemical cells convert energy that is generated by an oxidation reaction of fuel to electrical energy. On an anode of a fuel cell, organic fuel such as methanol, formaldehyde, or formic acid is oxidized to carbon dioxide, and on a cathode, air or oxygen is reduced to water. A high specific energy of organic fuel renders the fuel cell more attractive. For example, the specific energy of methanol is 6,232 wh/kg.

Fuel cells comprise a membrane electrode assembly (MEA) including an anode layer and a cathode layer, and a polymer electrolyte membrane (PEM) that is interposed between the two electrode layers and plays a role as a proton transfer medium. As the conductive polymer electrolyte of a fuel cell, a fluorine-containing polymer electrolyte membrane such as a perfluoro carbon sulfonic acid membrane (Nafion™ manufactured by the Dupont Company) has chemical stability, high ionic conductivity and good mechanical properties, and is generally used.

However, a fluorine-containing polymer electrolyte has a disadvantage in that it is prepared by a complicated process, and has a high manufacturing cost. Further, since a fluorine-containing polymer electrolyte has a heat-resistance limit of less than 100° C., a cooling system for reforming gas and a removing system for carbon monoxide are needed when it is used as a power source for an automobile, a commercial small-sized power plant, and a portable power plant. The proton conductivity deteriorates, and infiltration of methanol occurs at a high temperature of more than 80° C. or under low relative humidity of less than 60%.

Therefore, a sulfonated polymer such as sulfonated polyimide, polystyrene, polyphenylene, or polyetheretherketone (PEEK) has been researched as a polymer electrolyte membrane as a replacement for a fluorine-containing polymer electrolyte membrane. The Celanese company has developed poly[2,2'-(m-phenylene)-5,5'-bibenzimidazole] (polybenzimidazole, PBI) which can overcome shortcomings of the fluorine-containing polymer such as Nafion™. PBI has relatively lower methanol permeability, and can be manufactured at a lower cost than the fluorine-containing polymer. Further, it has conductivity at a high temperature of more than 100° C., and therefore it can be used as an electrolyte membrane material for a fuel cell at a high temperature, and carbon monoxide (CO) poisoning can be reduced.

Poly(2,5-benzimidazole) has a similar structure and conductivity to PBI, but it can be a polymer with a high molecular weight so that a polymer electrolyte having more improved mechanical properties for a fuel cell can be prepared. Poly(2,5-benzimidazole) is synthesized by heating 3,4-diaminobenzoic acid using polyphosphoric acid or a mixture of $P_2O_5$ and phosphoric acid as a dehydrating reagent. The aforementioned dehydrating reagent has a high viscosity and is hard to handle, and a polymerization is carried out at a high temperature of over 200° C. Further, a resultant polymer synthesized using the dehydrating reagent forms a rigid lump and is hard to purify. Also, the phosphoric acid of the conventional dehydrating reagent cannot be removed easily when it is doped on the polymer or is present in a polymer chain. Therefore, in order to use poly(2,5-benzimidazole) as a polymer electrolyte membrane for a fuel cell, a new synthesis method of the polymer must be researched.

SUMMARY OF THE INVENTION

It is an aspect of the present invention to provide a method for preparing poly(2,5-benzimidazole) having good proton conductivity and low methanol permeability, which can be used for polymer electrolyte membrane.

It is another aspect of the present invention to provide a poly(2,5-benzimidazole) electrolyte membrane prepared according to the method.

It is also an aspect of the present invention to provide a fuel cell comprising the poly(2,5-benzimidazole) electrolyte membrane.

To accomplish the above and other aspects of the present invention, the present invention provides a method for preparing poly(2,5-benzimidazole) comprising polymerizing 3,4-diaminobenzoic acid using a dehydrating reagent comprising $P_2O_5$ and $CX_3SO_3H$ (X is H or F).

The present invention also provides a method for preparing a poly(2,5-benzimidazole) electrolyte membrane comprising preparing a polymer solution including poly(2,5-benzimidazole) by polymerizing 3,4-diaminobenzoic acid using a dehydrating reagent comprising $P_2O_5$ and $CX_3SO_3H$ (X is H or F), and casting a polymer film of the polymer solution onto a substrate.

The present invention also provides a fuel cell comprising the poly(2,5-benzimidazole) electrolyte membrane prepared according to the method.

BRIEF DESCRIPTION OF THE DRAWING

A more complete appreciation of the invention and many of the attendant advantages thereof will be readily apparent as the same becomes better understood by reference to the following detailed description when considered in conjunction with the accompanying drawing, wherein.

DETAILED DESCRIPTION OF THE PREFERRED EMBODIMENTS

Figure 1:
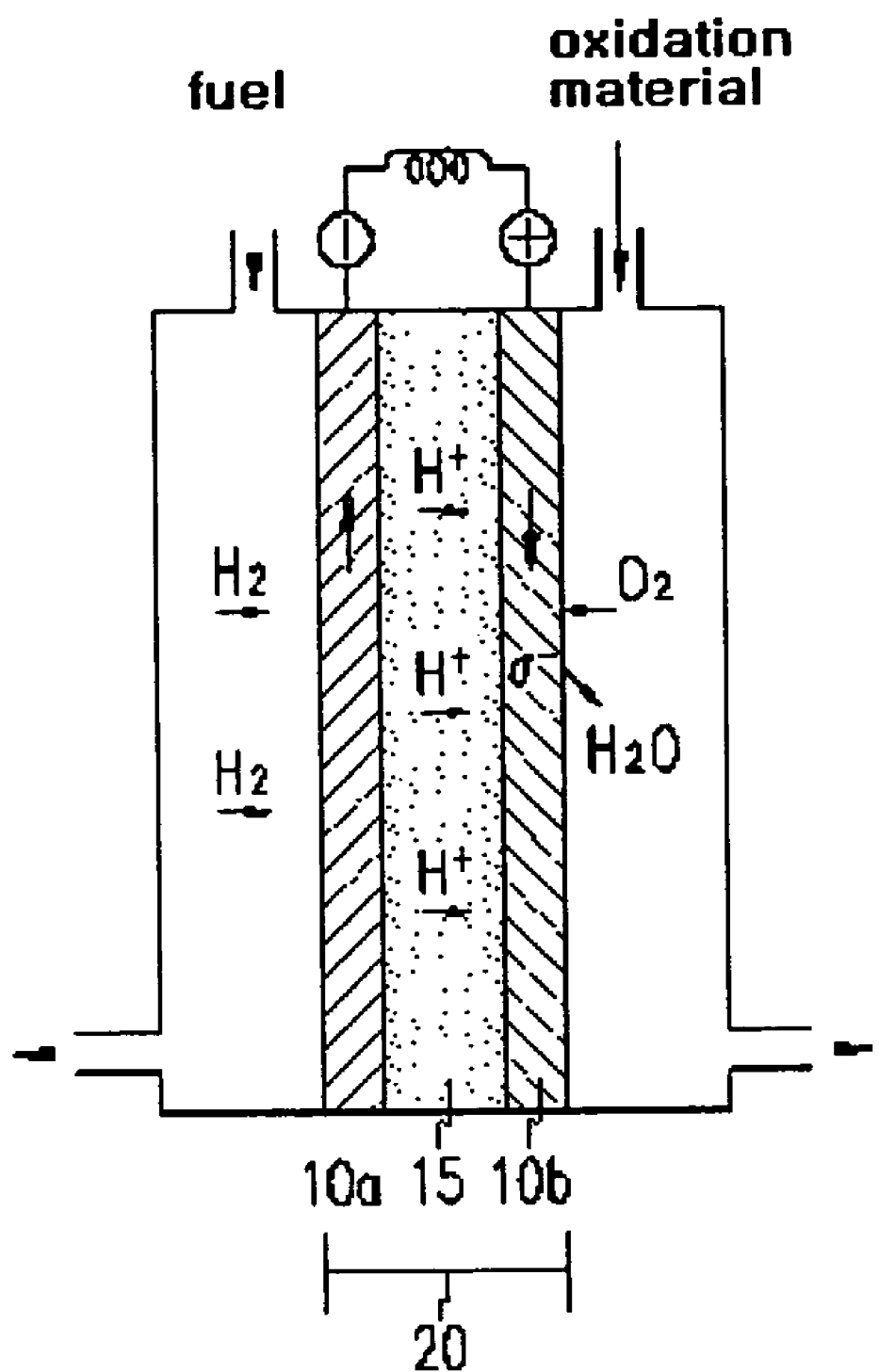
FIG. 1 is a systematic view of a polymer electrolyte membrane fuel cell (PEMFC).

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention.

Accordingly, the drawing and description are to be regarded as illustrative in nature, and not restrictive.

Poly(2,5-benzimidazole) of the present invention is synthesized using a dehydrating reagent comprising $P_2O_5$ and $CX_3SO_3H$ (X is H or F). 3,4-diaminobenzoic acid as a monomer is mixed with the above dehydrating reagent followed by heating to synthesize poly(2,5-benzimidazole). The 3,4-diaminobenzoic acid is preferably purified by reacting it with a base or an acid before mixing with the dehydrating reagent.

$P_2O_5$ and $CX_3SO_3H$ (X is H or F) are preferably premixed to form a homogeneous solution before mixing with the monomer. $P_2O_5$ and $CX_3SO_3H$ (X is H or F) are preferably used in the weight ratio of 0.5:10 to 2:10.

The dehydrating reagent is used as a transparent solution where $P_2O_5$ and $CX_3SO_3H$ are dissolved completely, and it is easy to handle because it has a similar viscosity to water at room temperature. When a conventional dehydrating reagent such as polyphosphoric acid or a mixture of $P_2O_5$ and phosphoric acid is used, polymerization is carried out at a high temperature of over 200° C. for 3 hours. On the contrary, when the aforementioned dehydrating reagent of the present invention is used, polymerization can be carried out at relatively low temperature of less than or equal to 160° C. for about 30 minutes.

Furthermore, the conventional dehydrating reagent has a high viscosity and can not mix homogeneously with the monomer, resulting in polymerization being carried out non-homogeneously. Since the resulting polymerized product is present in the state of a rigid lump, much time is necessary for recovery and purification of the product, and pulverization of the product is further necessary for preparing the polymer electrolyte membrane. That is to say, the product is pulverized and formed into a fine powder, chips, or fibers, and is then dissolved in solvent to prepare the polymer electrolyte membrane. When using the conventional dehydrating reagent, the polymerization process and the film-forming process for a polymer electrolyte membrane must be carried out separately.

On the contrary, in the present invention, monomers are completely dissolved in the dehydrating reagent, and the resulting product can be produced in the form of fine fibers. When using the dehydrating reagent of the present invention, the polymerization process and the film-forming process for the polymer electrolyte membrane can be carried out in one step, resulting in a reduction of preparation time and energy.

The polymer can be obtained by precipitating the synthesized polymer with a non-solvent (a solvent which cannot dissolve a polymer). The non-solvent preferably includes a mixture of water and alcohol such as methanol or ethanol.

Phosphoric acid of the conventional dehydrating reagent cannot be removed easily by a method of decompression when it is doped on the polymer or is present in a polymer chain. In order to remove phosphoric acid, pulverization, formation into a fiber shape, and reaction with ammonium hydroxide in a Soxhlet extractor are necessary. However, these processes generally need a long time and high energy, and therefore these processes have to be removed so as to effectively commercialize poly(2,5-benzimidazole) polymer electrolyte. In the present invention, phosphoric acid is almost all removed in precipitation of the synthesized polymer with non-solvent. Therefore, the aforementioned processes are not necessary and the process time is reduced.

Poly(2,5-benzimidazole) prepared according to the present invention is represented by the following formula 1:

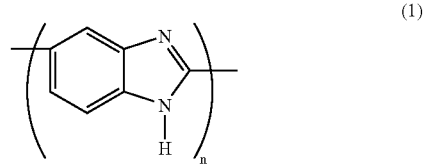

where n is a polymerization degree.

FIG. 1 illustrates a typical design of a PEMFC. A PEMFC comprises a membrane electrode assembly (MEA) 20 including an anode layer 10a, a cathode layer 10b and a polymer electrolyte membrane (PEM) 15 which is interposed between the two electrode layers. The membrane electrode assemblies are laminated using a bipolar plate with fluid flow channels formed thereon. The fuel cell generates electric power by electrochemical reaction between the anode 10a and the cathode 10b which are provided with fuel and oxidation material. Protons generated in the anode 10a are transferred to the cathode 10b through the polymer electrolyte membrane 15. Therefore, the polymer electrolyte membrane 15 needs high proton conductivity and low methanol permeability.

Poly(2,5-benzimidazole) prepared according to the present invention has high proton conductivity and low methanol permeability, and can therefore be used as a polymer electrolyte membrane for a fuel cell.

As described above, poly(2,5-benzimidazole) polymer is produced in the form of fine fibers, and it is easy to remove phosphoric acid doped on the polymer. The synthesized polymer is directly used for a film-forming process in order to prepare the polymer electrolyte membrane. That is to say, the polymer-containing solution is cast onto a substrate to prepare a polymer film. Optionally, the cast film is dipped in water to separate the film from the substrate. The film which is cast thinly renders $CX_3SO_3H$ and $P_2O_5$ to be easily removed. For example, $CX_3SO_3H$ can be easily removed by decompression at a high temperature and washing with a non-solvent.

The following examples further illustrate the present invention in detail, but are not to be construed to limit the scope thereof.

EXAMPLE 1

Preparation of Poly(2,5-benzimidazole)

1-1 Purification of 3,4-Diaminobenzoic Acid 50 g of 3,4-diaminobenzoic acid were dispersed in 500 ml of distilled water followed by heat-treatment at 70° C. Hydrazine hydrate was slowly added to obtain a homogeneous solution. 20 g of activated carbon black was added to the solution followed by heat-treatment for 30 minutes. The heat-treated solution was filtrated using CELITE, and the filtrated solution was cooled to room temperature. Acetic acid was added slowly until crystallization occurred. The crystalline compound produced by placing the filtrated solution at room temperature for one day was filtrated and dried in a vacuum oven at 70° C. for 36 hours. The produced compound was identified using $^1$H-NMR. $^1$H-NMR ($D_2SO_4$) δ8.40-8.15 (m, 2H, ArH), 7.62 (d, 1H, ArH, $J_3$=8.0 Hz); mp (DSC): 204° C. (temperature increment rate: 0.1° C./min).

1-2 Preparation of Dehydrating Reagent 2 g of $P_2O_5$ and 20 ml of $CH_3SO_3H$ were mixed for 12 hours to obtain a homogeneous dehydrating reagent solution.

1-3 Preparation of Poly(2,5-benzimidazole)

2 g of 3,4-diaminobenzoic acid purified in the above 1-1 were added to the dehydrating reagent solution prepared by the above 1-2, and this solution was heat-treated at 160° C. for 30 minutes. The heat-treated solution was poured slowly into a mixture of 300 ml of water and 300 ml of methanol using a peristaltic pump to obtain a fine polymer fiber product. The polymer fiber was added to a Soxhlet extractor including 10% of an ammonium hydroxide aqueous solution to remove phosphoric acid remaining in the polymer. The resultant compound was identified using $^1$H-NMR $^1$H-NMR ($D_2SO_4$) δ8.64-7.41 (b, 3H, ArH), 5.38 (s, 1H, N—H); viscosity at 30° C., measurement made using $H_2SO_4$: 4-5 dL/g)

EXAMPLE 2

Preparation of Poly(2,5-benzimidazole) Electrolyte Polymer Membrane 2 g of 3,4-diaminobenzoic acid purified in the above 1-1 of EXAMPLE 1 were added to the dehydrating reagent solution prepared in the above 1-2 of EXAMPLE 1, followed by heat-treatment at 160° C. for 30 minutes. The resultant polymer-containing solution was poured onto a glass plate and cast into a polymer film using a doctor blade. The polymer film was placed in a vacuum oven at 130° C., and $CH_3SO_3H$ was removed for 24 hours. The polymer film was further washed with water and ethanol to remove $CH_3SO_3H$ present in a trace amount.

EXAMPLE 3

Preparation of Poly(2,5-benzimidazole) Electrolyte Polymer Membrane 2 g of 3,4-diaminobenzoic acid purified in the above 1-1 of EXAMPLE 1 were added to the dehydrating reagent solution prepared in the above 1-2 of EXAMPLE 1. This solution was heat-treated at 160° C. for 30 minutes. The resultant polymer-containing solution was poured onto a glass plate and cast into a polymer film using a doctor blade. The cast polymer film was dipped in water to separate the polymer film from the glass plate. The polymer film was placed in a vacuum oven at 130° C., and $CH_3SO_3H$ was removed for 24 hours. The polymer film was further washed with water and ethanol to remove $CH_3SO_3H$ present in a trace amount.

In the present invention, monomers are completely dissolved in the dehydrating reagent to obtain a homogeneous polymerization system, and the resulting product can be obtained in the form of fine fibers to render purification easy. When using the dehydrating reagent of the present invention, the polymerization process and the film-forming process for a polymer electrolyte membrane can be carried out in one step, resulting in a reduction of preparation time and energy.

Poly(2,5-benzimidazole) prepared according to the present invention has high proton conductivity and low methanol permeability, and therefore can be used as a polymer electrolyte membrane for a fuel cell.

Further, poly(2,5-benzimidazole) has conductivity at a high temperature of more than 100° C., and therefore it can be used as an electrolyte membrane material for a fuel cell at a high temperature, and carbon monoxide (CO) poisoning can be reduced. When a fluorine-containing polymer such as Nafion™ is used as a polymer electrolyte membrane, fuel cells must be driven at high relative humidity of 80 to 100%, resulting in the need for a humidifier to be mounted in the fuel cell system. To the contrary, a fuel cell comprising poly(2,5-benzimidazole) as a polymer electrolyte membrane can be driven at low relative humidity of less than 10%, and therefore a humidifier is not necessary and the entire size of the fuel system can be reduced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing poly(2,5-benzimidazole), comprising:
   purifying the 3,4-diaminobenzoic acid; and
   polymerizing the purified 3,4-diaminobenzoic acid using a dehydrating reagent comprising $P_2O_5$ and $CX_3SO_3H$ where X is H or F to produce the poly(2,5-benzimidazole).

2. The method according to claim 1, wherein the $P_2O_5$ and the $CX_3SO_3H$ where X is H or F are used in a weight ratio of 0.5:10 to 2:10.

3. The method according to claim 1, further comprising precipitating the poly(2,5-benzimidazole) with a non-solvent to obtain the poly(2,5-benzimidazole) in the form of fine fibers.

4. The method according to claim 3, wherein the non-solvent is a mixture of water and alcohol.

5. The method according to claim 1, further comprising, before the polymerization step, mixing the $P_2O_5$ and the $CX_3SO_3H$ to obtain a homogeneous dehydrating reagent.

6. The method according to claim 1, wherein the step of polymerizing the purified 3,4-diaminobenzoic acid is carried out at the temperature of less than or equal to about 160° C.

7. Poly(2,5-benzimidazole) prepared according to the method of claim 1.

8. An electrolyte membrane comprising poly(2,5-benzimidazole) prepared according to the method of claim 1.

9. A method for producing a poly(2,5-benzimidazole) electrolyte membrane, comprising:
   preparing a polymer solution including poly(2,5-benzimidazole) by polymerizing the purified 3,4-diaminobenzoic acid using a dehydrating reagent comprising $P_2O_5$ and $CX_3SO_3H$ where X is H or F;
   casting a polymer film of the polymer solution onto a substrate to produce the poly(2,5-benzimidazole) electrolyte membrane; and
   optionally dipping the polymer film to separate the polymer film from the substrate.

10. The method according to claim 9, further comprising mixing the $P_2O_5$ and the $CX_3SO_3H$ to obtain a homogeneous dehydrating reagent before preparing the polymer solution.

11. The method according to claim 9, wherein the $P_2O_5$ and the $CX_3SO_3H$ where X is H or F are used in a weight ratio of 0.5:10 to 2:10.

12. The method according to claim 9, further comprising removing the $CX_3SO_3H$ from the polymer film.

13. The method according to claim 9, wherein the polymerization of the purified 3,4-diaminobenzoic acid is carried out at the temperature of less than or equal to about 160° C.

* * * * *